United States Patent
Yang

(10) Patent No.: US 7,313,204 B2
(45) Date of Patent: Dec. 25, 2007

(54) METHOD AND DEVICE FOR TRANSMITTING AND IDENTIFYING A MODULATION TYPE IN DIGITAL COMMUNICATION SYSTEMS BY WAY OF A PHASE ROTATION FACTOR APPLIED TO A TRAINING SEQUENCE

(75) Inventor: Bin Yang, Herrenberg (DE)

(73) Assignee: Infineon Technologies AG, Munich (DE)

( * ) Notice: Subject to any disclaimer, the term of this patent is extended or adjusted under 35 U.S.C. 154(b) by 704 days.

(21) Appl. No.: 10/706,779

(22) Filed: Nov. 12, 2003

(65) Prior Publication Data

US 2004/0096012 A1  May 20, 2004

Related U.S. Application Data

(63) Continuation of application No. PCT/DE02/01623, filed on May 6, 2002.

(30) Foreign Application Priority Data

May 21, 2001 (DE) .............................. 101 24 782

(51) Int. Cl.
*H03D 3/00* (2006.01)
*H03K 9/06* (2006.01)
(52) U.S. Cl. ..................................................... 375/322
(58) Field of Classification Search ................. 375/322
See application file for complete search history.

(56) References Cited

U.S. PATENT DOCUMENTS

| | | | |
|---|---|---|---|
| 5,289,476 | A | 2/1994 | Johnson et al. |
| 6,400,928 | B1 * | 6/2002 | Khullar et al. ............ 455/67.11 |
| 6,463,107 | B1 * | 10/2002 | Lindoff et al. .............. 375/343 |
| 6,473,506 | B1 | 10/2002 | Höök et al. |
| 7,058,148 | B1 * | 6/2006 | Huttunen ..................... 375/354 |

FOREIGN PATENT DOCUMENTS

| | | |
|---|---|---|
| EP | 0 413 153 | 2/1991 |
| WO | 00/10301 | 2/2000 |
| WO | 01/03397 A1 | 1/2001 |
| WO | 01/11790 A1 | 2/2001 |
| WO | 01/39449 A1 | 5/2001 |

* cited by examiner

*Primary Examiner*—David C. Payne
*Assistant Examiner*—Nader Bolourchi
(74) *Attorney, Agent, or Firm*—Laurence A. Greenberg; Werner H. Stemer; Ralph E. Locher

(57) ABSTRACT

Data symbols in the training sequence are rotated at the transmitter end through a phase rotation factor which is specific for a given modulation type that is used. For blind modulation detection at the receiver end, the data symbols are derotated through different phase rotation factors, and a correlation function is formed between the sequences obtained in this way and the original training sequence. The type of modulation which is used is obtained from the phase rotation factor which produces a maximum for the correlation function.

5 Claims, 2 Drawing Sheets

METHOD AND DEVICE FOR TRANSMITTING AND IDENTIFYING A MODULATION TYPE IN DIGITAL COMMUNICATION SYSTEMS BY WAY OF A PHASE ROTATION FACTOR APPLIED TO A TRAINING SEQUENCE

CROSS-REFERENCE TO RELATED APPLICATION

This application is a continuation of copending International Application No. PCT/DE02/01623, filed May 6, 2002, which designated the United States and which was not published in English.

BACKGROUND OF THE INVENTION

1. Field of the Invention

The invention lies in the field of communications. More specifically, the present invention relates in general to digital communications systems, in particular to mobile radio systems. Yet more specifically, the invention relates in particular to a transmission and reception method and to a receiver in a digital telecommunications system.

The EDGE (Enhanced Data Rates for GSM Evolution) and the associated packet service EGPRS (Enhanced GPRS) have been defined as a transitional standard between the GSM/GPRS and UMTS mobile radio standards. Both GMSK modulation and 8-PSK modulation are used in the EDGE standard. GMSK modulation uses a signal area with the signal points +1 and −1, while 8-PSK modulation uses a signal area with eight signal points. If the modulation type to be used for the information transmission between a transmitter and a receiver is not predetermined in a fixed manner, then the receiver must be informed of the modulation type which is being used.

Published international PCT application WO 00/10301 and its counterpart U.S. Pat. No. 6,473,506 B1, which are hereby incorporated by reference, describe a method for transmission and identification of the modulation type in digital communication systems. The process makes use of the training sequence which is included in a data burst. Each data burst comprises a fixed predetermined training sequence comprising a sequence of data symbols which is known to the receiver and which is used for channel estimation purposes in the receiver. The prior publication proposes that every feasible modulation type be identified by a specific phase rotation factor, and that the training sequence have a phase rotation factor applied to it, that is to say that the data symbols contained in it be rotated using the phase rotation factor. The same phase rotation factor as that which is also used for the modulation of the payload data is preferably used in that case. As is known, GMSK and 8-PSK modulation are distinguished by using different symbol rotation. While GMSK modulation rotates each transmission symbol onwards through 90 degrees, 8-PSK modulation carries out a rotation of 67.5 degrees per transmission symbol. The data symbols in the transmitted training sequence which have been rotated in phase in this way can be used in the receiver in such a way that, at the start of each data burst, the received training sequence in a number of data paths is rotated back through a corresponding number of phase rotation factors. In the quoted example of the two modulation types GMSK and 8-PSK modulation, the received training sequence is thus rotated back through 90 degrees and 67.5 degrees, respectively. After this, the received and derotated training sequence is compared with a training sequence to which a channel filter function obtained from a channel estimation process has been applied. The comparison is carried out by subtraction of these training sequences from one another, by addition of the squares of the differences, and by detection of the minimum.

This method has the disadvantage that a channel estimation process must be carried out in each of the data paths which are provided for derotation using the various phase rotation factors, and the comparison with the received and respectively derotated training sequence cannot be carried out until the completion of the channel estimation process and the application to the original training sequence of the channel parameters by means of the channel filter function which has been mentioned. The method is very complex and requires a large number of circuit units in the receiver.

SUMMARY OF THE INVENTION

It is accordingly an object of the invention to provide a method and device for transmitting and identifying the modulation type in digital communication systems by way of a phase rotation factor that is applied to the training sequence, which overcomes the above-mentioned disadvantages of the heretofore-known devices and methods of this general type and which reduce the complexity for detection of the modulation type in receivers in digital communications systems.

With the foregoing and other objects in view there is provided, in accordance with the invention, a transmission and reception method in a digital telecommunications system, which comprises:

at a transmitter end, rotating each data symbol in a predetermined initial sequence known to a receiver, in particular a training sequence of a data burst, through a phase rotation factor specific for a type of modulation being used;

at a receiver end, derotating the data symbols through different phase rotation factors to generate a derotated sequence; and forming a single correlation function between the derotated sequence and the initial sequence based on an assumed temporal position of the initial sequence contained in the received signal for each phase rotation factor;

forming a summation of products between the derotated sequence and the initial sequence for individual moments in time from the correlation function, and squaring a magnitude of the summation to form squares; and comparing the squares of the magnitudes and determining therefrom a modulation type used at the transmitter end.

In accordance with an added feature of the invention, the correlation function between the received sequences and the initial sequence is formed with the initial sequence in an original, unfiltered state.

With the above and other objects in view there is also provided, in accordance with the invention, a receiver for a digital telecommunications system, comprising:

means for receiving a data signal from a transmitter and containing an initial sequence known to the receiver and having each data symbol rotated through a phase rotation factor;

means connected to the receiving means for derotating the data symbols in the received initial sequence through different phase rotation factors;

means for forming a single correlation function between the sequence obtained by the derotating means and the initial sequence on the basis of an assumed temporal position of the initial sequence contained in the received signal for each phase rotation factor;

means for forming a summation of products between the sequence obtained by the derotating means and the initial sequence for individual moments in time;

means for squaring a magnitude of a summation for forming squares; and means for determining a maximum of the squares formed in the squaring means and determining therefrom a modulation type used at the transmitter.

The invention is primarily based on the significant knowledge that it is not absolutely essential to carry out a channel estimation process in every data path in the receiver in which derotation of the received training sequence is carried out. The invention deliberately avoids channel estimation in this early stage of detection of the modulation type. Instead of this, every received and derotated training sequence is compared directly with the original, unfiltered training sequence. The comparison is carried out via a correlation process, that is to say by multiplying the two training sequences with one another. After this, the modulation type is determined by which phase rotation factor reaches a maximum in the respective data path during the derotation and the subsequent correlation processes.

In this case, the invention is not restricted to using the training sequence, which is normally included in a data burst, in the described manner. In principle, it is also possible to use any other sequence of information data that is transmitted in any case during the communication process in the manner according to the invention, in order to transmit information about the modulation type.

In contrast with WO 00/10301 and U.S. Pat. No. 6,473,506 B1, the present invention does not require any channel estimation processes for detection of the modulation type, since a correlation is carried out between the received and derotated training sequence and the original, unfiltered training sequence. The original training sequence is therefore not subjected to any channel filter function before the correlation step is carried out. According to the invention only a number of data paths are therefore provided in the receiver, in each of which derotations of the received training sequence through predetermined phase rotation factors are carried out, with the derotation process in each data path being followed by a correlation process, in which the received, derotated training sequence is correlated with the original, unfiltered training sequence. Channel estimation is carried out only after the detection of the modulation type.

A further difference to the already mentioned document that forms this generic type is the nature of the mathematical comparison of the training sequences. While, in the case of the cited prior art, the training sequences to be compared are subtracted from one another, a correlation function is formed according to the invention. If the timing of the training sequence within the received data burst is known only with a certain accuracy, it is also possible to provide for the derotation and correlation processes to be carried out two or more times successively in each data path, with the training sequences that have to be multiplied by one another in the correlation step being shifted incrementally in time with respect to one another, and with the maximum correlation result being determined from these two or more correlation steps.

The invention will be explained in more detail in the following text with reference to an exemplary embodiment. The exemplary embodiment relates to the use of the two modulation types GMSK (Gaussian minimum shift keying) and 8-PSK (8-ary phase shift keying).

GMSK modulation can be approximated by way of amplitude modulation and, in consequence, can be interpreted as follows:

A. A bit $b_k$ (=0,1) which is supplied is mapped onto a symbol $a_k$ (=+1, −1) where k denotes a discrete moment in time.

B. The GMSK symbols $a_k$ are rotated using $\pi/2$ radians per symbol:

$$s_k = e^{jk\pi/2} a_k = j^k a_k \qquad (1)$$

C. The rotated GMSK symbols $s_k$ are filtered by means of a pulse filter:

$$\tilde{\chi}_k = \sum_{i=0}^{L} h_i s_{k-i} \qquad (2)$$

where $\tilde{\chi}_k$ is the modulated baseband signal, which is mixed with the desired carrier frequency and is then transmitted to the antenna.

8-PSK modulation is defined in a similar way. However, this differs from GMSK modulation in the number of bits that are mapped onto one symbol and in the rotation:

A. A group of three bits $\{b_{3k}, b_{3k+1}, b_{3k+2}\}$ which are supplied is mapped onto one 8-PSK symbol $$a_k = e^{jn\pi/4} \quad (0 \leq n \leq 7).$$

B. The 8-PSK symbols $a_k$ are rotated through $3\pi/8$ radians per symbol:

$$s_k = e^{jk3\pi/8} a_k \qquad (3)$$

C. The rotated 8-PSK symbols $s_k$ are filtered using a pulse filter:

$$\tilde{\chi}_k = \sum_{i=0}^{L} h_i s_{k-i} \qquad (4)$$

One 8-PSK data symbol thus contains three times as much information as one GMSK data symbol. 8-PSK modulation is thus used for high levels of data transmission, while GSK modulation is used for low levels of data transmission.

The EDGE Standard allows both modulation types to be used, and the modulation type to be changed from burst to burst. Initially, EDGE receivers do not know the modulation type that is used to modulate the data transmitted to them from the transmitter. For each burst, the EDGE receiver identifies only one block of complex-value baseband input data $x_k$, and must itself decide on the modulation type which is being used. This procedure is thus also referred to as blind modulation detection.

According to the invention, information about the modulation type that is being used is applied to the transmitted signal, for this purpose using the predetermined training sequence, which is known to the receiver and which is included in each GSM/EDGE burst. The data symbols in the training sequence are rotated at the transmitter end using a phase rotation factor which is also used for the modulation of the payload signals, although in principle a different phase rotation factor can also be used for this purpose.

Other features which are considered as characteristic for the invention are set forth in the appended claims.

Although the invention is illustrated and described herein as embodied in a transmission and identification of the modulation type in digital communication systems by means of a phase rotation factor which is applied to the training sequence, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
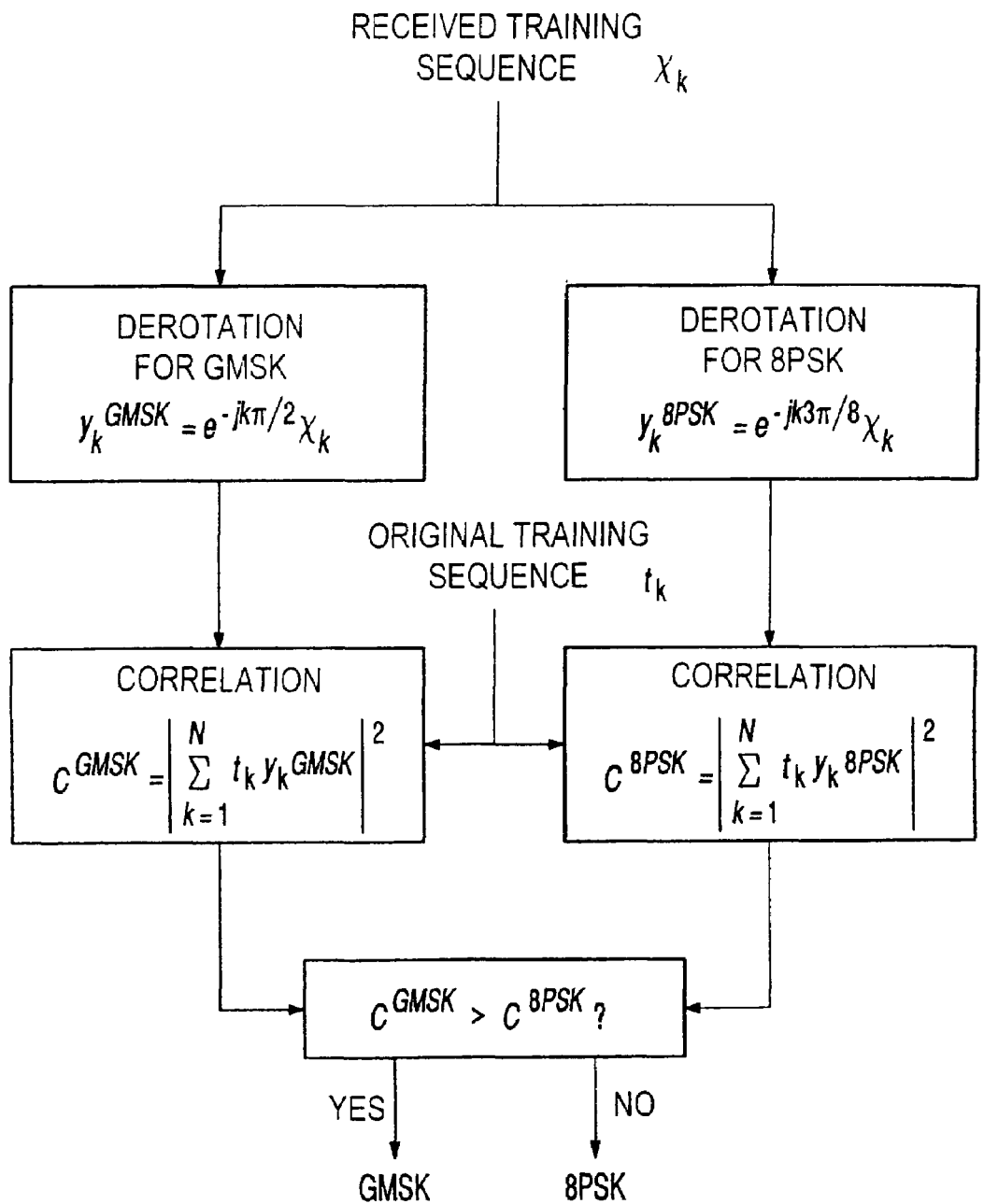
FIG. 1 is a schematic illustration of an exemplary embodiment for the method according to the invention for blind modulation detection.

Referring now to the figures of the drawing in detail, there is shown in FIG. 1 a flowchart for blind modulation detection in a receiver. A received training sequence $\tilde{\chi}_k$ is used to produce two samples, which are fed into two data paths corresponding to the two modulation types. In the figure, $\tilde{\chi}_k$ (k=1, 2, . . . , N) denotes the received training sequence. N denotes the length of the training sequence and $t_k$ (k=1, 2, . . . , N) denotes the original training sequence, which is stored in the receiver.

First of all, the received training sequence $\tilde{\chi}_k$ is derotated in the data paths through $-\pi/2$ per symbol for GMSK and through $-3\pi/8$ per symbol for 8-PSK.

After derotation, the received and respectively derotated training sequence $y_k$ is correlated with the original training sequence $t_k$. Since the correlation may be complex numbers since the phase of the signal is unknown, the square of the magnitude of the correlation is calculated after summation of the products for the individual moments in time k.

Finally, the correlation result between GMSK and 8-PSK is compared. If the received, derotated training sequence $y_k^{GMSK}$ is more similar to the original training sequence $t_k$ than the received and derotated training sequence $y_k^{8PSK}$, that is to say $c^{GMSK} > c^{8PSK}$, this results in the detection conclusion that the corresponding data burst is modulated using the modulation type GMSK. Otherwise, the detection process indicates that the modulation time is 8-PSK.

After this blind modulation detection, the demodulator can then start the channel estimation process.

Owing to the fact that uncertainties in the timing of the received training sequence may exist within the data burst, it is possible to provide for the correlation process to be carried out two or more times successively in each data path, by the training sequences to be correlated with one another being shifted in time with respect to one another. It is thus possible first of all to carry out a first correlation process in each data path on the basis of specific assumptions about the timing of the training sequence.

The data symbols in the sequences $t_k$ and $y_k$ to be correlated can then be passed once again to the correlator, with a slight offset with respect to one another. The maximum of two or more correlation processes carried out in this way is then chosen.

The method according to the invention for automatic identification of the modulation type which is being used is distinguished by a high hit confidence, with less complexity than the prior art.

Figure 2:
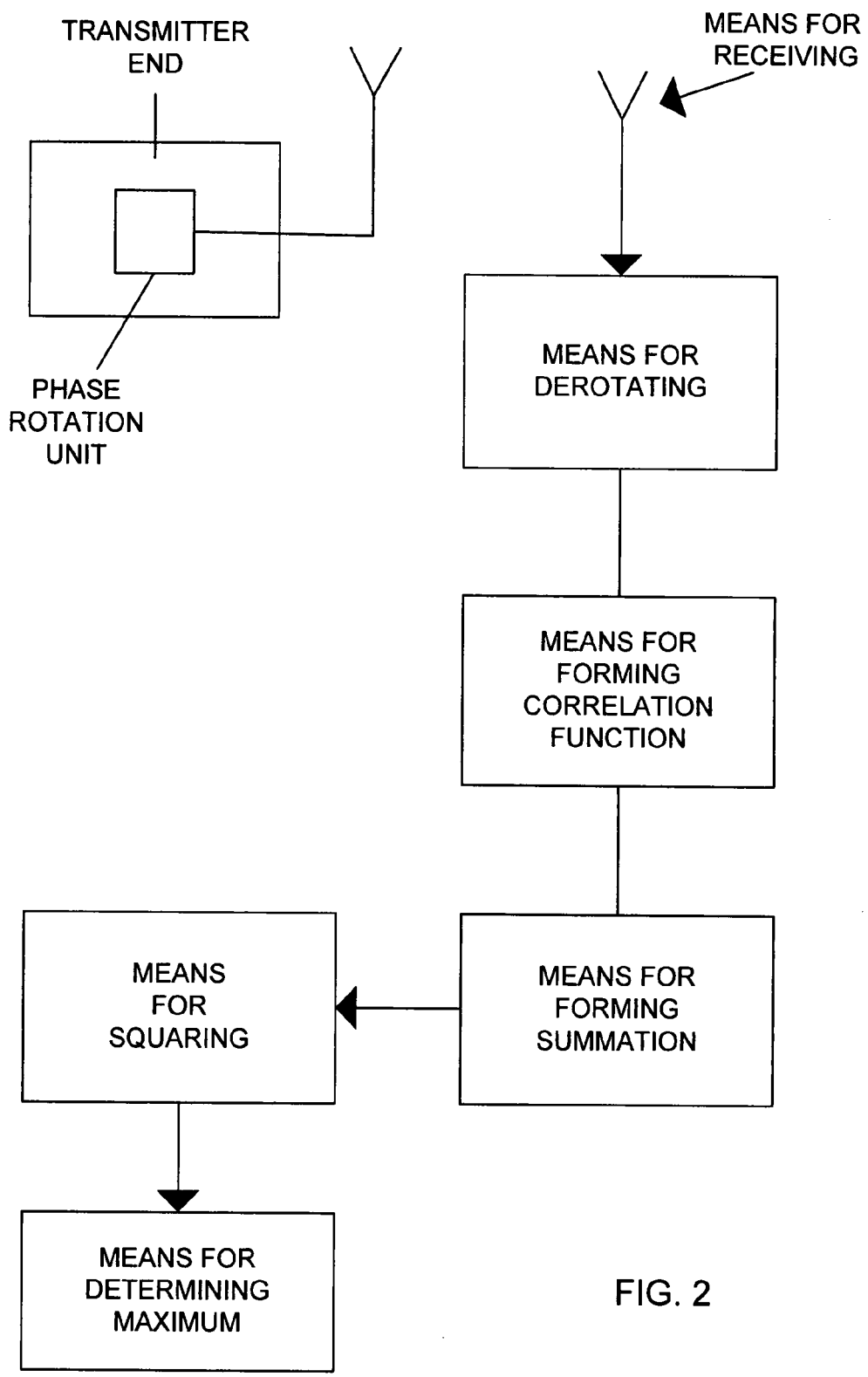
FIG. 2 is a diagram showing a transmitter and a receiver with the functional units according to the invention.

Referring now to FIG. 2, the transmitter according to the invention includes a phase rotation unit and an antenna. The receiver includes means for derotating, means for forming a correlation function, means for forming a summation, means for storing, and means for determining a maximum.

I claim:

1. A transmission and reception method in a digital telecommunications system, which comprises:

at a transmitter end, rotating each data symbol in a predetermined initial sequence known to a receiver through a phase rotation factor specific for a type of modulation being used to thereby form rotated data symbols;

at a receiver end, derotating the rotated data symbols through different phase rotation factors to generate a derotated sequence; and forming a correlation function between the derotated sequence and the initial sequence based on an assumed temporal position of the initial sequence contained in a signal received at the receiver end for each phase rotation factor, wherein a temporal position of the initial sequence is known up to a certain accuracy;

forming a summation of products between the derotated sequence and the initial sequence for individual moments in time from the correlation function, and squaring a magnitude of the summation to form squares; and comparing the squares of the magnitudes and determining therefrom a modulation type used at the transmitter end.

2. The transmission and reception method according to claim 1, wherein the initial sequence is a training sequence of a data burst.

3. The transmission and reception method according to claim 1, which comprises forming the correlation function between the received sequences and the initial sequence in an original, unfiltered state.

4. A receiver for a digital telecommunications system, comprising:

means for receiving a data signal from a transmitter, the data signed containing an initial sequence known to said receiver and each data symbol being rotated through a phase rotation factor;

means connected to said receiving means for derotating the data symbols in the received initial sequence through different phase rotation factors;

means for forming a correlation function between the sequence obtained by said derotating means and the initial sequence on the basis of an assumed temporal position of the initial sequence contained in the received signal for each phase rotation factor, wherein a temporal position of the initial sequence is known up to a certain accuracy;

means for forming a summation of products between the sequence obtained by said derotating means and the initial sequence for individual moments in time;

means for squaring a magnitude of a summation for forming squares; and means for determining a maximum of the squares formed in said squaring means and determining therefrom a modulation type used at the transmitter.

5. The transmission and reception method according to claim 1, which comprises forming the correlation function several times successively, thereby forming one correlation function at an assumed temporal position of the initial sequence contained in the received signal, and forming further correlation functions by shifting the received sequence and the initial sequence incrementally in time with respect to one another.

* * * * *